(12) United States Patent
Weimer

(10) Patent No.: US 7,856,909 B2
(45) Date of Patent: Dec. 28, 2010

(54) SCREW PRESTRESSING DEVICE AND METHOD

(75) Inventor: Peter Weimer, Markdorf (DE)

(73) Assignee: Astrium GmbH, Munich (DE)

( * ) Notice: Subject to any disclaimer, the term of this patent is extended or adjusted under 35 U.S.C. 154(b) by 0 days.

(21) Appl. No.: 11/778,440

(22) Filed: Jul. 16, 2007

(65) Prior Publication Data

US 2008/0011129 A1 Jan. 17, 2008

(30) Foreign Application Priority Data

Jul. 17, 2006 (DE) .................. 10 2006 033 320

(51) Int. Cl.
*B25B 29/02* (2006.01)
*B25B 23/151* (2006.01)
*B25B 13/48* (2006.01)

(52) U.S. Cl. .............. 81/57.38; 81/55; 81/470

(58) Field of Classification Search ........... 81/57.38, 81/470, 479, 55
See application file for complete search history.

(56) References Cited

U.S. PATENT DOCUMENTS

| 2,760,393 | A | * | 8/1956 | Stough | 81/57.38 |
| 2,899,855 | A | | 8/1959 | Neville et al. | |
| 3,830,536 | A | | 8/1974 | Frisch et al. | |
| 3,969,810 | A | * | 7/1976 | Pagano | 81/470 |
| 3,995,828 | A | * | 12/1976 | Orban | 81/57.38 |
| 4,246,810 | A | * | 1/1981 | Keske | 81/57.38 |
| 4,454,790 | A | * | 6/1984 | Rieben | 81/57.38 |
| 5,257,207 | A | | 10/1993 | Warren | |
| 5,520,076 | A | * | 5/1996 | Junkers | 81/479 |
| 5,878,490 | A | | 3/1999 | Heinold et al. | |
| 6,763,570 | B2 | * | 7/2004 | Abbott et al. | 81/57.38 |
| 7,066,699 | B2 | | 6/2006 | Gosling | |
| 2004/0115024 | A1 | | 6/2004 | Gosling | |
| 2009/0013518 | A1 | | 1/2009 | Monville | |

FOREIGN PATENT DOCUMENTS

| CH | 668 932 | 2/1989 |
| DE | 26 25 407 | 12/1977 |
| DE | DD 245 389 | 5/1987 |
| EP | 0 695 883 | 2/1996 |
| FR | 2 071 195 | 9/1971 |
| FR | 2 222 178 | 10/1974 |
| FR | 2 871 231 | 12/2005 |
| GB | 1 504 1583 | 2/1981 |

OTHER PUBLICATIONS

English language abstract of CH668932.
European search report in EP07012979 (with partial English language translation).
German Office Action dated Aug. 20, 2010 that issued with respect to patent family member German Patent Application No. 10-2006-033320.9.

* cited by examiner

*Primary Examiner*—Hadi Shakeri
(74) *Attorney, Agent, or Firm*—Greenblum & Bernstein, P.L.C.

(57) ABSTRACT

A screw prestressing device having a piston and a draw pin structured and arranged to be disconnectably coupled to an element and movable, via the piston, to apply a defined prestressing force in the element.

24 Claims, 2 Drawing Sheets

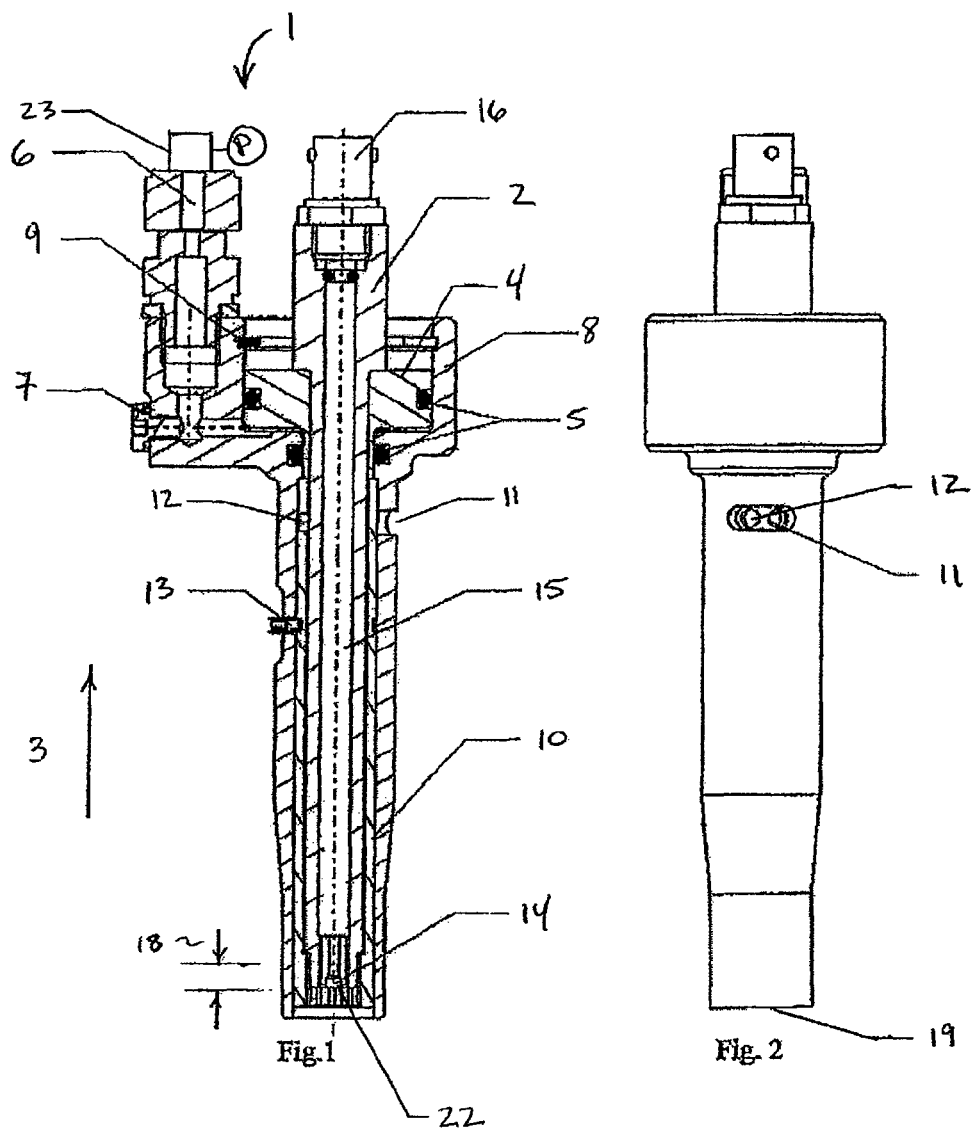

Screw prestressing device mounted on a threaded assembly

SCREW PRESTRESSING DEVICE AND METHOD

CROSS-REFERENCE TO RELATED APPLICATIONS

The present application claims priority under 35 U.S.C. §119 of German Application No. 10 2006 033 320.9-12 filed Jul. 17, 2006, the disclosure of which is expressly incorporated by reference herein in its entirety.

BACKGROUND OF THE INVENTION

1. Field of the Invention

The invention relates to a water hydraulic screw prestressing device free of torque with integrated ultrasonic prestressing monitoring.

2. Discussion of Background Information

Threaded assemblies provide detachable connections of components. The important factor for these connections is the spring action of the screw and screwed parts (flange). Tightening a screw with a prestressing force causes a stretching of the screw and a compression of the flange. The resulting friction produces a connection of the two parts in the radial direction, where the prestressing force itself blocks the axial degree of freedom of the parts involved.

The most common tightening methods, i.e., methods of applying a prestressing, can be divided into two groups. With the first group, the shanks of the screws are strained by the nuts being rotated. The screws, or studs, are stretched and strained by the rotary motion according to the pitch of the thread. These standard threaded assemblies have the disadvantage that if the maximum prestressing forces are utilized in the screw, or stud, torques are inevitably transferred via the unavoidable thread friction. This leads to a superimposition of the stress in the screw, or stud, (tensile stress plus shearing stress) and furthermore, to a transfer of the thread torque to the flange to be tightened. Due to the superimposition of the stress in the screw, or stud (tensile stress plus shearing stress), the threaded assembly cannot be tightened up to the maximum permissible tensile stress. Furthermore, in the case of delicate parts, such as, e.g., the ceramic mirrors of a spectrometer (e.g., in the NirSpec space project), the transfer of the thread torque to the flange to be tightened leads to an unacceptable and inadmissible deformation of the mirror surface.

In the NirSpec space project (the follow-up project to the Hubble telescope) and, as expected in all future optical space projects, all optical mirrors (e.g., ceramic) have to be tightened via frictional contact and a three-screw attachment with the highest prestressing force and, as far as possible, free of torque. In-house tests with conventional tightening methods have shown that torques transferred to the ceramic mirror foot have a negative impact (i.e., performance loss) on the high demands on the mirror surface.

With the second group of tightening methods, the shanks of the screws are first stretched (e.g., with the aid of hydraulic cylinders), then the nuts are applied in the stretched state of the screws, or studs. After the stretching force is removed, the connection is braced. Torsional friction effects are thus of only secondary importance; shearing stresses in the studs virtually do not occur. In the prior art, hydraulic screw prestressing units are known from the construction of nuclear power plants and wind turbine generator systems. However, these units are known only for very large threaded assemblies (from diameter M24 upwards) and all operate on the basis of oil hydraulics. A hydraulic screw prestressing device for threaded assemblies from M4 to M12 is not known in the prior art. Additionally, water hydraulic screw prestressing devices are not known in the prior art.

Through the use of an oil hydraulic system, these screw prestressing devices have the disadvantage that in practice they are not suitable for cleanroom applications, such as are necessary, e.g., in applications in the field of space flight. An oil hydraulic system can be used in a cleanroom only to a limited extent, namely with special, complex additional measures.

The known hydraulic screw prestressing units, which are known only for very large threaded assemblies, furthermore have the disadvantage that, in the case of damage, they would lead to a destruction of sensitive elements, e.g., highly sensitive optical elements, such as are used in the field of space flight.

In space flight projects, most reduced-weight threaded assemblies have to be monitored and tightened with the highest prestressing forces. In particular, with the use of so-called optical benches, threaded assemblies are to be tightened if possible without the influence of torque, while at the same time with the highest cleanness class. Every friction produced (e.g., metal on metal, but also metal on ceramic) inevitably leads to abrasive wear, which in turn can impact the optical surfaces. The subject matter of the invention solves these problems in particular in an optimal manner.

SUMMARY OF THE PRESENT INVENTION

An aim of the current invention is a screw prestressing device and method for tightening threaded assemblies, if possible, without the influence of torque, while at the highest cleanness class.

According to the invention, a screw prestressing device comprises a first device that is mounted on a second device such that the first device can be moved outwards in a preferred direction to apply a defined prestressing force in the second device via a third device. Further advantageous embodiments of the invention are contained in the dependent claims.

One advantage of the screw prestressing device according to the invention is that this screw prestressing device is suitable for cleanroom applications without special complex additional measures being necessary.

Another advantage of the screw prestressing device according to the invention is that this screw prestressing device is suitable for applications in connection with highly sensitive optical elements; i.e., these highly sensitive optical elements are not destroyed by the use of the screw prestressing unit.

Another advantage of the screw prestressing device according to the invention is that this screw prestressing device is able to tighten screws utilizing the maximum permissible prestressing, without the influence of torque, and while at the same time with the highest cleanness class. In particular, when used on so-called optical benches, threaded assemblies are to be tightened, if possible, without the influence of torque, while at the same time maintaining the highest cleanness class. Every friction produced (e.g., metal on metal, but also metal on ceramic) inevitably leads to abrasive wear, which in turn can also impact the optical surfaces.

Another advantage of the screw prestressing device according to the invention is that this screw prestressing device supports the possibility of monitoring threaded assemblies during the tightening process in a two-fold manner (via hydraulic pressure monitoring and via ultrasonic stretching measurement).

Another advantage of the screw prestressing device according to the invention is that this screw prestressing device is able to tighten threaded assemblies with the highest prestressing forces. Thus, for example, depending on the screw material used (e.g., titanium, steel, or inconel), the screws can be tightened to within a few percent of their permissible yield point.

According to an aspect of the invention, a screw prestressing device comprises a piston, and a draw pin structured and arranged to be disconnectably coupled to a second device and to move outwards in a prestressing direction, via the piston, to apply a defined prestressing force in the second device.

According to a further aspect of the invention, the element comprises a threaded assembly comprising a screw, a flat washer, and a nut.

According to a further aspect of the invention, the draw pin is structured and arranged to be disconnectably coupled to the screw via a threaded connection.

According to a further aspect of the invention, the draw pin is movable in a pull direction.

According to a further aspect of the invention, the piston comprises a water hydraulic piston.

According to a further aspect of the invention, the draw pin comprises a high-strength draw pin.

According to a further aspect of the invention, the screw prestressing device further comprises a plurality of O-rings, wherein the piston is sealed with the O-rings.

According to a further aspect of the invention, the screw prestressing device further comprises a connecting adaptor structured and arranged to releasably couple a high-pressure water hand pump to the screw prestressing device for generating a water hydraulic pressure.

According to a further aspect of the invention, the screw prestressing device further comprises at least one calibrated pressure sensor structured and arranged to detect and document the water hydraulic pressure.

According to a further aspect of the invention, the screw prestressing device further comprises a bleeding device structured and arranged to bleed air locks.

According to a further aspect of the invention, the screw prestressing device further comprises a locking device structured and arranged to prevent inadmissible movements of the piston.

According to a further aspect of the invention, the screw prestressing device further comprises a cylinder, structured and arranged to guide the piston therein, having an end structured and arranged to be placed on the flat washer of the threaded assembly to be tightened.

According to a further aspect of the invention, the screw prestressing device further comprises a nut drive unit rotatably-mounted between the draw pin and the cylinder, wherein the cylinder further comprises a nut drive opening, the nut drive unit is accessible from an outside of the cylinder via the nut drive opening, and the nut drive unit is structured and arranged to maintain the nut of the threaded assembly in a constant engagement during a tightening operation.

According to a further aspect of the invention, the nut drive unit and a pin applied externally to the nut drive unit are structured and arranged to rotate the nut of the threaded assembly when the defined prestressing force has been reached until the nut is in contact with the flat washer of the threaded assembly.

According to a further aspect of the invention, the nut drive unit comprises at least one hole on a circumference of the nut drive unit at a level of the nut drive opening, wherein the at least one hole is accessible from the outside of the cylinder via the nut drive opening.

According to a further aspect of the invention, the screw prestressing device further comprises a prestressing detector structured and arranged to detect a prestressing force applied to the screw.

According to a further aspect of the invention, the prestressing detector comprises a contact unit arranged within the draw pin and having an ultrasonic sensor structured and arranged to transmit and receive an ultrasonic signal, a connector structured and arranged to provide an electrical connection to the contact unit, and an insulation sleeve arranged within the draw pin, and electrically connecting the contact unit and the connector.

According to a further aspect of the invention, the ultrasonic sensor comprises a piezo sensor.

According to a further aspect of the invention, the contact unit is spring-loaded.

According to a further aspect of the invention, the draw pin and the nut drive unit are interchangeable with a plurality of draw pins and a plurality of corresponding nut drive units, respectively, wherein each of the respective plurality of draw pins and each of the plurality of corresponding nut drive units is structured for a particular threaded assembly size.

According to a further aspect of the invention, the threaded assembly has a size of or between M4 and M12.

According to a further aspect of the invention, a method of prestressing a threaded assembly in a screw prestressing device comprises disconnectably coupling a draw pin to a screw of the threaded assembly, and moving the draw pin, via a moving of a water hydraulic piston, to apply a defined prestressing force in the threaded assembly.

According to a further aspect of the invention, a method of prestressing a threaded assembly in a screw prestressing device further comprises maintaining a nut of the threaded assembly in a constant engagement during a tightening operation, and when the defined prestressing force has been reached, rotating the nut of the threaded assembly, via a nut drive unit, until the nut is in contact with a flat washer of the threaded assembly.

According to a further aspect of the invention, a method of prestressing a threaded assembly in a screw prestressing device further comprises detecting a prestressing force applied to the screw by transmitting an ultrasonic signal through the screw and receiving a reflected signal through the screw indicative the prestressing force applied to the screw.

According to a further aspect of the invention, a method of prestressing a threaded assembly in a screw prestressing device further comprises detecting a prestressing force applied to the screw by at least one of a prestressing detector and sensing and documenting of water hydraulic pressure.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 shows the prestressing device according to the invention;

FIG. 2 shows an external view of the prestressing device according to the invention;

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Embodiments of the screw prestressing device according to the invention are described below in connection with the drawings. The invention relates to a water hydraulic screw prestressing unit that is suitable in particular for small screw diameters (e.g., from M4 to M12 of the metric ISO standard, or equivalent sizes).

However, the invention is not restricted to screw diameters from M4 to M12. Rather, the invention is suitable for all screw diameters. In particular, the water hydraulic system does not restrict the application for large screws, since the maximum possible water pressure can be consistently adjusted by enlarging the piston.

Figure 4:
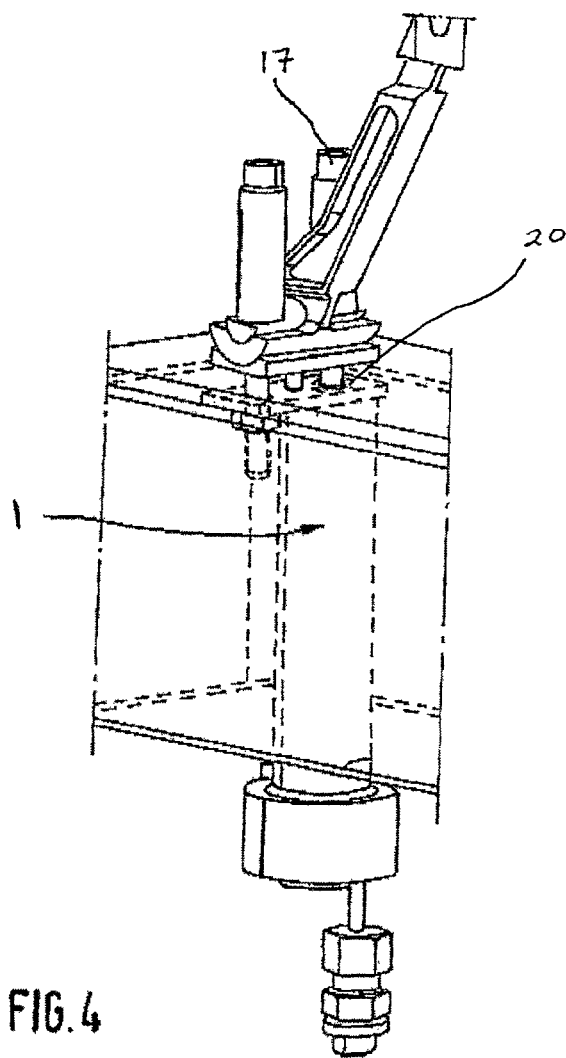
FIG. 4 shows the prestressing device according to the invention placed on a threaded assembly.

FIG. 1 shows a screw prestressing device 1 according to the invention. A high-strength draw pin 2 is screwed on the thread of a threaded assembly 17 (see FIG. 4), wherein the thread projects into draw pin 2 a distance 18 of at least 1.5 d, wherein d is the thread diameter of the screw or the stud. According to the invention, the draw pin 2 is moved outwards (upwards) in a pull direction 3 to apply a defined prestressing force in the threaded assembly 17. The force is applied via a water hydraulic piston 4 sealed with O-rings 5. Since it is contemplated that high-strength threaded assemblies may be tightened by the present invention, the thread of the draw pin 2 must have at least the strength of the highest strength threaded assembly 17 that is to be tightened. This strength of the draw pin 2 corresponds approximately to a yield point of greater than or equal to 1000 N/mm².

The water hydraulic pressure is generated via a commercial high-pressure water hand pump (not shown) and read out and documented via calibrated pressure sensors 23.

Figure 3:
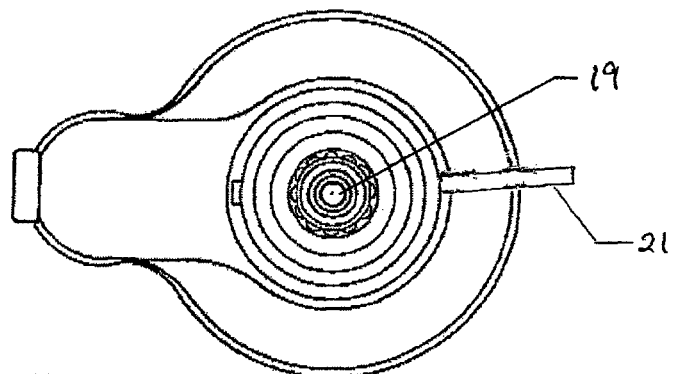
FIG. 3 shows a plan view of the prestressing device according to the invention.

The hydraulic prestressing device 1 is connected to the commercial high-pressure water hand pump, with the aid of a commercial high-pressure metal pleated hose, via the connecting adapter 6 of the prestressing device 1. Any air locks can be bled via the bleed screw 7 before startup. The piston 4 is guided in a cylinder 8. Additionally, an end 19 (see FIGS. 2 and 3) of the cylinder 8 is supported or placed on a flat washer 20 of the threaded assembly 17 (comprising a screw and a nut) to be tightened (shown in FIG. 4).

The applied prestressing force leads to a stretching of the threaded assembly 17 and to the lifting of the nut of the threaded assembly 17, which was previously applied only with manual force. Inadmissible piston paths are prevented via the snap ring 9 (mechanical stop). The nut of the threaded assembly 17 is in constant engagement during the tightening operation with a nut drive unit 10 that is rotatably mounted between draw pin 2 and cylinder 8 and accessible from outside via the nut drive opening 11 (see FIG. 2).

Once the defined prestressing force has been reached, the nut of the threaded assembly 17 is rotated clockwise via the nut drive unit 10 and a pin 21 applied externally to the nut drive unit 10 until the nut is in contact with the flat washer of the threaded assembly 17. To this end, the nut drive unit 10 has one or more holes 12 drilled around the circumference of the nut drive unit 10 at a level of the nut drive opening 11. Further, as shown in FIG. 2, these holes 12 may be accessible from outside the cylinder 8.

If nine holes 12 are used, for example, the nut of the threaded assembly can be applied via these holes 12 in 40° steps in a torque-free manner. In the case of a different number of holes 12 being used, the number of degrees of the steps is altered accordingly.

In order to facilitate a prestressing of threaded assemblies having different thread sizes, both the draw pin 2 and the nut drive unit 10 may be replaced with a few hand movements. More specifically, the draw pin 2 may be pulled off upwards, the nut drive unit 10 may be removed downwards after a setscrew 13 has been opened.

Furthermore, the invention relates to a device that comprises the above-described screw prestressing device 1, and additionally a prestressing detector device, which detects the prestressing during the tightening operation. This prestressing detection device comprises a commercially available ultrasonic measuring unit (not shown). Additionally, the prestressing detector device comprises a spring-loaded contact unit 14, which is integrated into the draw pin unit 2 (which may differ according to thread size) via an insulation sleeve 15. The contact unit 14 can control and read out an ultrasonic sensor 22 (e.g., an ultrasonic piezo sensor) mounted on a thread overhang. An electrical connection to the contact unit 14 is made via a commercial plug-and-socket connector 16 (e.g., a bayonet Neill-Concelman (BNC) connector).

In the case of the ultrasonic piezo sensor, an ultrasonic signal is transmitted via a piezo element to the opposite end of the threaded assembly, reflected there and received by the piezo element again. The real stretching of the threaded assembly can be detected via the different run length of the signal. Thus, the existing prestressing in the screw, or stud, can be read out and documented.

Additionally, according to a further aspect of the invention, the prestressing may be measured and quantified by utilizing the pressure readings of the water hydraulic pressure from the pressure sensors.

Thus, according to the invention, small to medium-sized (e.g., diameters M4 to M12), high-strength threaded assemblies, monitored and documented in a twofold manner (by hydraulic pressure and ultrasonic measurement) with the aid of the water hydraulic screw prestressing device 1, can be tightened up to the limit of their load capacity without any torque superimposition. The screw prestressing device 1 is suitable in particular for use in space integration rooms, since no impermissible contaminations or no contaminations that cannot be easily removed occur even in the event of technical failure (water as hydraulic medium, lowest volumes in the high-pressure area (approx. 3 to 10 cm³)). Through the use of the prestressing unit 1, threaded assemblies can be optimized in terms of weight within space applications. Moreover, losses of performance/efficiency caused by torque are reduced to a minimum, in particular with the use of optical satellites.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A screw prestressing device comprising:
   a piston positioned within a cylinder;
   a draw pin structured and arranged to be disconnectably coupled to an element and movable, via the piston, to apply a defined prestressing force in the element;
   a nut drive unit defined by an extension of said piston rotatably mounted between the draw pin and the cylinder;
   the cylinder, structured and arranged to guide the piston therein, having an end positionable around a threaded assembly to be tightened and an opposite end including a connecting adaptor, and
   a pressure chamber formed by the piston and the cylinder and arranged in the cylinder, which receives a pressure fluid via the connecting adaptor to apply the defined prestressing force.

2. The screw prestressing device of claim 1, wherein the element comprises the threaded assembly comprising a screw, a flat washer, and a nut.

3. The screw prestressing device of claim 2, wherein the draw pin is structured and arranged to be disconnectably coupled to the screw via a threaded connection.

4. The screw prestressing device of claim 2, further comprising a prestressing detector structured and arranged to detect a prestressing force applied to the screw.

5. The screw prestressing device of claim 4, wherein the prestressing detector comprises:
   a contact unit arranged within the draw pin and having an ultrasonic sensor structured and arranged to transmit and receive an ultrasonic signal;
   a connector structured and arranged to provide an electrical connection to the contact unit; and
   an insulation sleeve arranged within the draw pin, and electrically connecting the contact unit and the connector.

6. The prestressing device of claim 5, wherein the ultrasonic sensor comprises a piezo sensor.

7. The prestressing device of claim 5, wherein the contact unit is spring-loaded.

8. The prestressing device of claim 2, wherein the threaded assembly has a size of or between M4 and M12.

9. The screw prestressing device of claim 1, wherein the draw pin is movable in a pull direction.

10. The screw prestressing device of claim 1, wherein the piston comprises a water hydraulic piston.

11. The screw prestressing device of claim 1, wherein the draw pin comprises a high-strength draw pin.

12. The screw prestressing device of claim 1, further comprising a plurality of O-rings, wherein the piston is sealed with the O-rings.

13. The screw prestressing device of claim 1, wherein the connecting adaptor is structured and arranged to releasably couple a high-pressure water hand pump to the screw prestressing device for generating a water hydraulic pressure.

14. The screw prestressing device of claim 13, further comprising at least one calibrated pressure sensor structured and arranged to detect and document the water hydraulic pressure.

15. The screw prestressing device of claim 1, further comprising a bleeding device structured and arranged to bleed air locks.

16. The screw prestressing device of claim 1, further comprising a locking device structured and arranged to prevent inadmissible movements of the piston.

17. The screw prestressing device of claim 1, wherein the cylinder further comprises a nut drive opening, the nut drive unit is accessible from an outside of the cylinder via the nut drive opening, and the nut drive unit is structured and arranged to maintain the nut of the threaded assembly in a constant engagement during a tightening operation.

18. The screw prestressing device of claim 17, wherein the nut drive unit and a pin applied externally to the nut drive unit are structured and arranged to rotate the nut of the threaded assembly when the defined prestressing force has been reached until the nut is in contact with the flat washer of the threaded assembly.

19. The screw prestressing device of claim 17, wherein the nut drive unit comprises at least one hole on a circumference of the nut drive unit at a level of the nut drive opening, wherein the at least one hole is accessible from the outside of the cylinder via the nut drive opening.

20. The prestressing device of claim 1, wherein the draw pin and the nut drive unit are interchangeable with a plurality of draw pins and a plurality of corresponding nut drive units, respectively, wherein each of the respective plurality of draw pins and each of the plurality of corresponding nut drive units is structured for a particular threaded assembly size.

21. A method of prestressing a threaded assembly, comprising:
   providing a screw prestressing device including a piston positioned within a cylinder, a draw pin structured and arranged to be disconnectably coupled to an element and movable, via the piston, to apply a defined prestressing force in the element, a nut drive unit defined by an extension of said piston rotatably mounted between the draw pin and the cylinder, the cylinder, structured and arranged to guide the piston therein, having an end positionable around a threaded assembly to be tightened and an opposite end including a connecting adaptor, and a pressure chamber formed by the piston and the cylinder and arranged in the cylinder, which receives a pressure fluid via the connecting adaptor to apply the defined prestressing force;
   disconnectably coupling the draw pin to a screw of the threaded assembly; and
   moving the draw pin, via a moving of a water hydraulic piston, to apply a defined prestressing force in the threaded assembly.

22. The method of claim 21, further comprising:
   maintaining a nut of the threaded assembly in a constant engagement during a tightening operation; and
   when the defined prestressing force has been reached, rotating the nut of the threaded assembly, via the nut drive unit, until the nut is in contact with a flat washer of the threaded assembly.

23. The method of claim 21, further comprising detecting a prestressing force applied to the screw by transmitting an ultrasonic signal through the screw; and
   receiving a reflected signal through the screw indicative the prestressing force applied to the screw.

24. The method of claim 21, further comprising detecting a prestressing force applied to the screw by at least one of a prestressing detector and sensing and documenting of water hydraulic pressure.

* * * * *